Dec. 12, 1939.  C. A. ROBINSON  2,182,821
CLUTCH MECHANISM
Filed Sept. 20, 1937
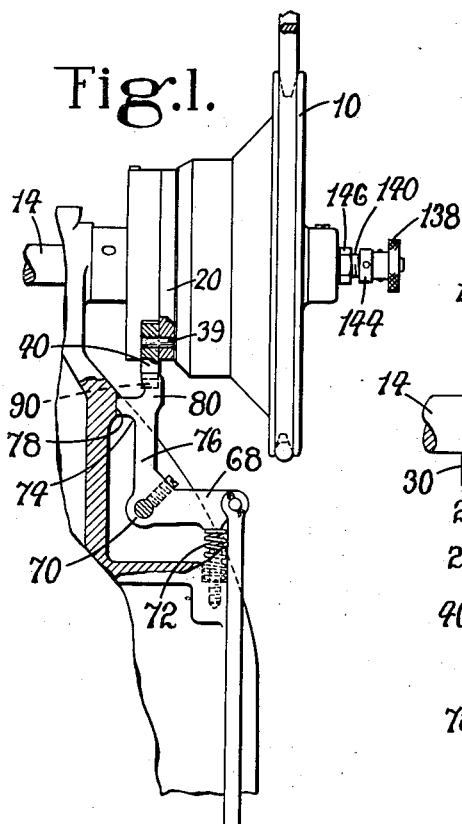
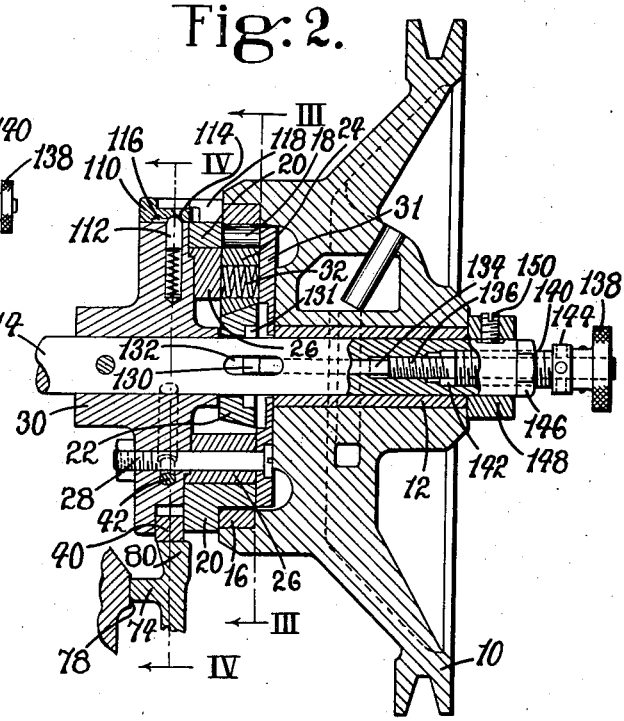
INVENTOR
Charles A. Robinson
By his attorney
Victor Cobb Patented Dec. 12, 1939

2,182,821

UNITED STATES PATENT OFFICE 2,182,821

CLUTCH MECHANISM

Charles A. Robinson, Salem, Mass., assignor to United Shoe Machinery Corporation, Borough of Flemington, N. J., a corporation of New Jersey Application September 20, 1937, Serial No. 164,710

11 Claims. (Cl. 192—27)

This invention relates to roller clutches and is herein illustrated as embodied in a roller clutch similar to the well-known "Horton" type of clutch, but modified as shown in United States copending application of Vernon H. Meyer, Serial No. 103,548, filed October 1, 1936, now United States Patent No. 2,158,192, dated May 16, 1939.

In the Meyer construction a floating member is provided to equalize, between three similar sets of devices, the load produced by the wedging action of the rollers in driving the driven member from the driving member.

It is a principal object of the present invention to provide a roller clutch, having the load equalizing feature of the Meyer clutch, with convenient means for releasing the rollers, without any disassembling of the clutch, if the rollers should become tightly wedged together, or jammed, under excessive load.

Related objects of the invention are to provide convenient means for adjusting the parts to provide new working surfaces for the parts without any disassembling operation and to provide an additional safety device to prevent accidental engagement of the clutch under power while the machine to which it is attached it being turned over by hand to make adjustments therein.

With the above and other objects in view, a feature of the invention consists in a floating member which is axially tapered, and preferably frusto-conical, together with abutment means, normally fixed in adjusted position, to resist longitudinal movement of the frusto-conical member axially of the shaft, during normal operation of the clutch. Whenever the rollers become locked or jammed by overloading, so that the clutch cannot be disengaged normally, the abutment means may be moved by the operator away from adjusted position. This will permit the frusto-conical member to move axially to relieve the wedging pressures and disengage the locked clutch. The abutment means can subsequently be repositioned readily into the original adjusted position by the aid of a stop member. This adjustment and the releasing movement is accomplished preferably by means extending through the shaft and accessible at its outer end.

Another feature of the invention consists in a novel intermediate member which will suitably cooperate with the frusto-conical floating, or other angularly tapered, member.

Other objects and features of the invention will be best understood and appreciated from inspection of the accompanying drawing when considered in connection with the following description.

In the drawing,

Fig. 1 is a side elevation showing the driving means for a machine and a tripping mechanism for starting and stopping the clutch (such as illustrated in said Meyer application) but with the adjusting mechanism of the present invention extending from the outer end of the shaft;

Fig. 2 is a vertical section of the clutch construction of the present invention taken on line II—II of Fig. 3, looking in the direction of the arrows;

Fig. 3 is a section on the line III—III of Fig. 2, looking in the direction of the arrows; and Fig. 4 is a section on the line IV—IV of Fig. 2, looking in the direction of the arrows.

The driving member of the clutch consists of a grooved pulley 10, provided with a bushing 12 and loosely mounted on the shaft 14 of the machine to be driven. Fitted to the inboard end of the pulley 10 is a hardened steel ring 16 which is of the usual type employed in roller clutches. When the clutch is engaged, three relatively small rollers 18 are arranged to engage the ring 16 frictionally. The movement of these rolls is controlled by a relatively movable roller cage 20 in substantially the usual manner, as will be described briefly hereinafter.

A frusto-conical member 22, having a central bore larger than the driving shaft 14 on the machine, surrounds the shaft but is not in contact therewith, it being arranged to float in this substantially coaxial position by being held by three intermediate members or blocks 24, each of which is pressed against the sides of the frusto-conical member 22, at points spaced 120° apart, by its cooperating roller 18 when the clutch is engaged. The blocks or intermediate members 24 are maintained in the above-described positions by means of a cage 26, in compartments of which they fit freely radially (and with slight clearance circumferentially), and which cage will rotate with the shaft 14 because of the fact that it is held by a series of screws 28 which are tapped into a collar-like member 30 fixed upon the shaft. These screws also secure a cover plate 31 which holds the parts of the clutch in position.

In order to keep the blocks 24 in position ready to be engaged wedgingly by the rollers 18 when the clutch is tripped, and to enable the blocks 24 to support the weight of the frusto-conical member 22 in its floating position, each block 24 is held frictionally in the desired position in the following manner. Each of these blocks is provided with a central bore and a coiled spring 32 is positioned in the bore. The spring is under slight compression, one end abutting on a portion of the cage 26 and the other end abutting on the cover plate 31. Each block is a free fit on the compressed spring 32 and is also a free fit lengthwise between the cage 26 and cover plate 31 in addition to being a free fit in its slot, or compartment, 33 is the cage 26. The friction on the ends of the springs 22 is sufficient to hold them, the weight of their respective blocks 24, and the frusto-conical member 22 in any position that they may assume, but such friction permits these parts to move easily to any position into which they may be forced by pressure placed on them in the operation of the clutch. This arrangement also prevents the parts from rattling, as they would if substantial movement were necessary each time to bring them into operating position.

The collar-like member 30 is provided with a substantially radial slot 34 into which fits the curved end of a short arm 36 of a spring operated bell-crank lever 38 (see Fig. 4). The bell-crank lever 38 is mounted on a pivot pin 39 extending from the roller cage 20 (as shown in section in Fig. 1) and is provided with another and longer arm 40. Spring operation of the bell-crank lever is effected by a spring-pressed plunger 42, which engages the arm 40 of the bell-crank lever, the plunger being mounted in a bore in the member 30 and being forced outwardly by means of a coiled spring 44 mounted in the bore behind the plunger (see Fig. 4). The spring is maintained in the bore by means of a screw plug 45.

When the bell-crank lever 38 is permitted to move under the influence of the spring 44, it swings in the slot 34 about the curved end of its short arm 36. This carries its pivot pin 39, and thereby the movable roller cage 20, in which the pin is secured, forwardly (clockwise in Fig. 3). This forward movement of the cage causes each small roller 18 wedgingly to engage its co-operating loosely and frictionally mounted block 24 which is then forced forwardly against the side of its compartment in the cage 26 and radially inwardly against the frusto-conical member 22 by continued forward movement of the cake 20.

Because the pressure of each block 24 on the frusto-conical member 22 is supported by resultant pressure of the other two blocks 24, the pressure of all three blocks is equalized on the frusto-conical member 22, maintaining it in its central floating position in the same manner as the floating member in said Meyer application is maintained in floating position. Thus, each roller 18 and block 24 takes an equal share of the load and therefore all wear is equalized. If the rollers or blocks should be of unequal hardness, the pressure after unequal wear would still be equalized until the floating position of the frusto-conical member 22 becomes so eccentric as to bring it in contact with the shaft 14, as would occur in the Meyer construction under similar conditions.

When the clutch is tripped, the roller cage 20 moves into its forward position, thus carrying each roller 18 into frictional engagement with its co-operating block 24, so that the clutch ring 16 in the rotating driving pulley 10 then rotates the rollers 18 so that they roll up on the surfaces 25 of the blocks 24, forcing the blocks 24 radially inward to lock each block 24 frictionally to the floating frusto-conical member 22. The blocks 24 then bodily drive the cage 26 forwardly as they are in contact with the sides of their compartments 33. The cage 26, through the screws 28 and the collar-like member 30, then drives the shaft 14 and its machine forwardly, this continuing as long as the cage 20 is held in its forward position under the influence of the spring 44; in other words as long as the clutch is engaged.

The clutch may be engaged or disengaged in the usual manner by means of a treadle 60 and its cooperating mechanism, illustrated in Fig. 1. The treadle is pivotally mounted at 62 in a bracket 64 secured to the floor. The treadle is connected to a treadle rod 66, the upper end of which is pivotally connected to the horizontal arm 68 of a bell-crank lever 70. The lever 70 is normally forced in a counterclockwise direction, and the treadle is thereby lifted, by means of a compression spring 72, mounted on the frame of the machine. This movement is limited by an abutment 74 on an upstanding arm 76 of the lever, the abutment 74 striking a cooperating abutment 78 on the frame of the machine.

Above the abutment 74, on the arm 76, of the bell-crank lever 70 is an upward extension 80 which stops the machine at the time that the abutments 74 and 78 are in contact with each other, or when the treadle is released, as will be explained. When the treadle is depressed, the extension 80 is freed from the arm 40 of the bell-crank lever 38 and is also freed at the same time from an abutment 90, secured to the member 30. The machine is then started because the spring 44 then rotates the bell-crank lever 38 in a clockwise direction (the slot 34 acting as a pivot), moving the small rollers 18 into wedging engagement with the ring 16 and the blocks 24 into engagement with the frusto-conical member 22 to engage the clutch, as heretofore described, to drive the machine.

To stop the machine, the treadle 60 is raised, permitting the bell-crank lever 70 to rotate in a counterclockwise direction (Fig. 1) and bring its upward extension 80 into the path of movement of the long arm 40 of the bell-crank 38 so that the movable roller cage is moved relatively backward, by a prying action, to disengage the rollers. After the rollers have been disengaged, the arm 40 moves no further because of its arcuate surface 92. The machine shaft is finally stopped by the abutment 90 striking the extension 80.

A safety device, of the type used in the Meyer construction, is provided to lock the roller cage 20 in disengaged position, so that the machine cannot be started, and cause damage, while adjustments are being made. This device (see Figs. 2 and 4) consists of a sliding member 110 located in a T-slot in the member 30 and held in either operative or inoperative position by a spring-pressed plunger 112 which may enter either a depression 114 or a depression 116 in the slide. The slide 110 is normally in the position where it is held by the depression 114 but it may be moved to the right (Fig. 2) where its end will enter the slot 118 in the roller cage 20 so that the cage cannot be moved by the spring 44 to cause the engagement of the clutch, even if the treadle should be depressed accidentally.

An additional safety device of another type, in which the parts of the clutch cannot possibly be brought into frictional engagement, irrespective of the position of the roller cage, will be described later.

When a machine that is driven by a roller clutch is suddenly overloaded, it sometimes happens that the rollers in the clutch are locked, or jammed, so tightly between the driving and driven parts of the clutch that the entire clutch must be disassembled to free the rollers; this, of course, involving delay, inconvenience and often considerable expense.

In furtherance of the principal object of the present invention, the rollers 18 in applicant's clutch can be readily released, whenever they become jammed, by permitting the floating frusto-conical member 22 to move longitudinally, axially of the shaft 14, away from normal operating position.

The member 22 is held in normal operative position against movement axially along the shaft 14, by an abutment in the form of a transverse key 130. This key sets loosely in a cylindrical recess 131 in one end of the floating frusto-conical member 22 which, as illustrated, is the large end toward the outer end of the shaft 14. The key passes through a transverse, elongated slot 132 in the shaft 14. The position of the key, longitudinally along the shaft 14, is determined by an adjustable abutment rod 134 which passes through a longitudinal bore in the shaft. The outer portion of the rod 134 is enlarged, this enlarged portion having a thread 136 cut on its inner end adjoining the smaller portion of the rod. The thread 136 engages a tapped portion of the bore in the shaft 14, to provide for adjusting the abutment rod 134 longitudinally of the shaft. Adjustment of this rod is made manually by means of a knurled head 138 pinned to the outer end of the rod. The enlarged portion of the rod 134 passes through a sleeve 140, the outside of which sleeve is threaded into a still larger concentrically tapped hole 142 in the bore in the shaft 14. This sleeve is provided with a head 144 which is provided with holes for a spanner wrench by which it may be adjusted relatively to the shaft 14 and then locked in position by means of a lock nut 146. The head 144 of the sleeve serves as an adjustable stop against which the hub of the knurled head 138 makes contact when the abutment rod 134 is rotatably adjusted to bring the floating frusto-conical member 22 into operative position.

If the rollers 18 become locked by overloading the clutch, the abutment rod 134 may be moved to the right (Fig. 2) by turning the knurled head 138 so that the thread 136 on the rod is partially unscrewed in the tapped hole 142. This will allow the frusto-conical member 22 to move in the same direction, out of operative position, to release the rollers from their locked position. It will be noted that, when the rollers are thus released, the clutch cannot be engaged in any manner. This provides the additional safety device to which reference has already been made.

In order to return the member 22 back into operative position after the rollers have been released, it is only necessary to turn the knurled head 138 until it engages the outer end of the threaded sleeve 140 which will bring the abutment rod 134 to its previously adjusted position.

A collar 148 is mounted on the outer end of the shaft 14 and is held by a set screw 150 to prevent longitudinal movement of the pulley 10 along the shaft.

The inner ends of the blocks 24 are beveled at the same angle as the floating frusto-conical member 22 so as to make substantially line contact therewith. The rollers 18 make line contacts with their respective blocks 24 on other beveled surfaces 25 of the blocks when the clutch is engaged, and when these lines of contact become worn, the abutment rod 134 may be adjusted (by adjusting the stop sleeve 140) to locate the member 22 in a new longitudinal position along the shaft, which provides a radial adjustment of the blocks 24. Such radial adjustment provides a new line of contact between each roller 18 and the surface 25 of its co-operating block 24 and this adjustment may be made several times during the life of the clutch to provide new lines of contact on the surfaces 25 and a long life of the blocks 24.

Having thus described the invention, what I claim as new and desired to secure by Letters Patent of the United States is:

1. A pressure receiving and relieving mechanism for a roller clutch, said mechanism having, in combination, a shaft, an axially-tapered member coaxial with the shaft and movable longitudinally axially relatively thereto, means to resist such movement during normal operation of the clutch, and means to permit such movement when the clutch cannot be disengaged normally.

2. A pressure receiving and relieving mechanism for a roller clutch, said mechanism having, in combination, a shaft, a frusto-conical member coaxial with the shaft and movable longitudinally axially relatively thereto, an abutment to resist such movement during normal operation of the clutch, and means to render the abutment ineffective and thus permit such movement when the clutch cannot be disengaged normally.

3. A pressure receiving, equalizing and relieving mechanism for a roller clutch, said mechanism having, in combination, a shaft, an axially-tapered floating member coaxial with the shaft and movable longitudinally axially relatively thereto, a bore in the shaft, and means extending through said bore and capable of being positioned by the operator either to resist or to permit such axial movement.

4. A pressure receiving and relieving mechanism for a roller clutch, said mechanism having, in combination, a shaft, an axially-tapered member coaxial with the shaft and movable longitudinally axially relatively thereto, an abutment to resist such movement, an abutment rod for adjustably positioning said abutment, and an adjustable stop for predetermining an adjusted position of said rod.

5. A pressure receiving, equalizing and relieving mechanism for a roller clutch, said mechanism having, in combination, a shaft, a frusto-conical floating member coaxial with the shaft and movable longitudinally axially relatively thereto, an abutment to resist such movement, an abutment rod for adjustably positioning said abutment, and an adjustable stop for predetermining an adjusted position of said rod.

6. A pressure receiving, equalizing and relieving mechanism for a roller clutch, said mechanism having, in combination, a shaft, a frusto-conical floating member coaxial with the shaft and movable longitudinally axially relatively thereto, an abutment to resist such movement, a coaxial abutment rod for adjustably positioning said abutment, and an adjustable coaxial stop for predetermining an adjusted position of said rod.

7. A roller clutch having, in combination, a shaft, a driving member, a driven member, a floating axially tapered member in spaced relation to and substantially coaxial with the shaft, a cage connected with the shaft and having three compartments equally spaced circumferentially, blocks one of which is freely positioned in each of said compartments, each block having a surface constructed and arranged to contact with the axially tapered member, and three rollers each arranged to contact with the driving member and with one of the blocks at the will of the operator to wedge and lock the blocks with equalized pressure to the driving member and to the frusto-conical member, whereby the blocks will collectively drive the cage and thereby the shaft.

8. A roller clutch having, in combination, a shaft, a driving member, a driven member, a floating frusto-conical member in spaced relation to and substantially coaxial with the shaft, a cage connected with the shaft and having three compartments equally spaced circumferentially, blocks one of which is freely positioned in each of said compartments, each block having a surface constructed and arranged to contact with the frusto-conical member, and three rollers each arranged to contact with the driving member and with one of the blocks at the will of the operator to wedge and lock the blocks with equalized pressure to the driving member and to the frusto-conical member, whereby the blocks will collectively drive the cage and thereby the shaft.

9. A roller clutch having, in combination, a shaft, a driving member, a driven member, a floating frusto-conical member in spaced relation to and substantially coaxial with the shaft, means for applying a plurality of wedging pressures between the driving member and the floating member to engage the clutch, said frusto-conical member equalizing said wedging pressures, means to disengage the clutch in normal operation by removing said wedging pressures by reverse operation of said applying means, abutment means normally fixed in adjusted position to resist longitudinal movement of the frusto-conical member axially of the shaft during normal operation of the clutch, additional means to permit the abutment means to be moved away from adjusted position, when the clutch cannot be disengaged normally, to permit the frusto-conical member to move axially and relieve the wedging pressures and prevent further engagement of the clutch while the parts are in that position, and means to permit the abutment to be returned to said adjusted position for normal operation.

10. A roller clutch having, in combination, a shaft, a driving member, a driven member, a floating frusto-conical member in spaced relation to and substantially coaxial with the shaft, means for applying a plurality of wedging pressures between the driving member and the floating member to engage the clutch, said frusto-conical member equalizing said wedging pressures, means to disengage the clutch in normal operation by removing said wedging pressures by reverse operation of said applying means, abutment means normally fixed in adjusted position to resist longitudinal movement of the frusto-conical member axially of the shaft during normal operation of the clutch, additional means coaxial with the shaft to permit the abutment means to be moved away from adjusted position, when the clutch cannot be disengaged normally, to permit the frusto-conical member to move axially and relieve the wedging pressures and prevent further engagement of the clutch while the parts are in that position, and means to permit the abutment to be returned to said adjusted position for normal operation.

11. A roller clutch having, in combination, a shaft, a driving member, a driven member, a floating frusto-conical member in spaced relation to and substantially coaxial with the shaft, means for applying a plurality of wedging pressures between the driving member and the floating member to engage the clutch, said frusto-conical member equalizing said wedging pressures, means to disengage the clutch in normal operation by removing said wedging pressures by reverse operation of said applying means, a transverse elongated slot passing diametrically through the shaft, a transverse key in the slot, said key acting as an abutment for the frusto-conical member, a longitudinal bore in the shaft, an abutment rod adjustably threaded in said bore to position the key, and thereby the frusto-conical member, and an adjustable stop for determining a preadjusted position of the abutment rod.

CHARLES A. ROBINSON.